(12) United States Patent
Zhang et al.

(10) Patent No.: US 8,417,949 B2
(45) Date of Patent: Apr. 9, 2013

(54) TOTAL EXCHANGE SESSION SECURITY

(75) Inventors: Hao Zhang, Sammamish, WA (US); Samuel J. Neely, Sammamish, WA (US); Trevor Freeman, Sammamish, WA (US)

(73) Assignee: Microsoft Corporation, Redmond, WA (US)

( * ) Notice: Subject to any disclaimer, the term of this patent is extended or adjusted under 35 U.S.C. 154(b) by 1231 days.

(21) Appl. No.: 11/335,487

(22) Filed: Jan. 19, 2006

(65) Prior Publication Data

US 2007/0101159 A1    May 3, 2007

Related U.S. Application Data

(60) Provisional application No. 60/731,798, filed on Oct. 31, 2005.

(51) Int. Cl.
*H04L 9/00* (2006.01)

(52) U.S. Cl. ........ 713/169; 713/168; 713/192; 713/193; 380/282

(58) Field of Classification Search ............. 713/192, 713/193, 168, 169; 380/282
See application file for complete search history.

(56) References Cited

U.S. PATENT DOCUMENTS

| | | | |
|---|---|---|---|
| 5,548,649 A * | 8/1996 | Jacobson | 713/153 |
| 6,519,771 B1 | 2/2003 | Zenith | |
| 7,350,074 B2 * | 3/2008 | Gupta et al. | 713/157 |
| 7,350,076 B1 | 3/2008 | Young et al. | |
| 7,356,601 B1 * | 4/2008 | Clymer et al. | 709/229 |
| 2002/0023215 A1 * | 2/2002 | Wang et al. | 713/171 |
| 2002/0025046 A1 * | 2/2002 | Lin | 380/282 |
| 2002/0055898 A1 * | 5/2002 | Burakoff et al. | 705/35 |
| 2002/0129264 A1 * | 9/2002 | Rowland et al. | 713/200 |
| 2003/0055898 A1 * | 3/2003 | Yeager et al. | 709/205 |
| 2003/0226017 A1 * | 12/2003 | Palekar et al. | 713/168 |
| 2003/0229781 A1 * | 12/2003 | Fox et al. | 713/155 |
| 2003/0229789 A1 * | 12/2003 | Morais et al. | 713/171 |
| 2003/0233577 A1 * | 12/2003 | Bellino | 713/201 |
| 2004/0003247 A1 * | 1/2004 | Fraser et al. | 713/169 |

(Continued)

FOREIGN PATENT DOCUMENTS

| | | |
|---|---|---|
| JP | 2003-179592 | 6/2003 |
| WO | 2005031586 A1 | 4/2005 |

OTHER PUBLICATIONS

Simon Josefsson GNU Shishi Kerberos 5 implementation for the GNU system for version 0.0.17, Jul. 2, 2004.*

(Continued)

*Primary Examiner* — Beemnet Dada
*Assistant Examiner* — Sayed Beheshti Shirazi
(74) *Attorney, Agent, or Firm* — Merchant & Gould

(57) ABSTRACT

A protocol for total email and collaborative software (e.g., Exchange-brand server) session security. By way of example, securing the traffic between two servers within the same organization or cross organizations is critical to maintaining privacy of electronic data and communications. For example, securing communications between two Exchange-brand servers is particularly useful for individuals and organizations that routinely send and receive confidential information via electronic mail. It is important for the receiving side (server) to authorize the sending side (client) to send the information; the sending side should authorize the receiving side to receive information to prevent unauthorized information disclosure. The novel system and/or protocol disclosed herein can provide a mutually authenticated, authorized, and encrypted channel between two servers both within the same organization and across disparate organizations.

14 Claims, 8 Drawing Sheets

U.S. PATENT DOCUMENTS

| | | | | |
|---|---|---|---|---|
| 2004/0230799 | A1* | 11/2004 | Davis | 713/169 |
| 2005/0033958 | A1* | 2/2005 | Connell | 713/156 |
| 2005/0135271 | A1* | 6/2005 | Inoue et al. | 370/254 |
| 2005/0144450 | A1* | 6/2005 | Voice | 713/169 |
| 2005/0152305 | A1* | 7/2005 | Ji et al. | 370/328 |
| 2005/0182937 | A1* | 8/2005 | Bedi | 713/171 |
| 2005/0198508 | A1* | 9/2005 | Beck | 713/170 |
| 2005/0223226 | A1* | 10/2005 | Sundararajan | 713/168 |
| 2005/0240762 | A1* | 10/2005 | Mao | 713/168 |
| 2006/0129804 | A1* | 6/2006 | Satkunanathan et al. | 713/156 |
| 2006/0189298 | A1* | 8/2006 | Marcelli | 455/411 |
| 2006/0236385 | A1* | 10/2006 | Innes et al. | 726/10 |
| 2007/0130464 | A1* | 6/2007 | Swedor et al. | 713/170 |
| 2007/0157027 | A1* | 7/2007 | Palekar et al. | 713/171 |
| 2007/0180225 | A1* | 8/2007 | Schmidt | 713/152 |
| 2007/0180500 | A1* | 8/2007 | Tanada | 726/4 |
| 2008/0059789 | A1* | 3/2008 | Lucidarme | 713/153 |
| 2008/0130897 | A1* | 6/2008 | Donatelli et al. | 380/278 |
| 2008/0141034 | A1* | 6/2008 | Bartram et al. | 713/176 |
| 2008/0175388 | A1* | 7/2008 | Okabe et al. | 380/277 |
| 2009/0006840 | A1* | 1/2009 | Birger et al. | 713/151 |
| 2009/0210934 | A1* | 8/2009 | Innes | 726/7 |

OTHER PUBLICATIONS

Regan t. et al.: "Media Center Buddies: Instant Messaging around a Media Center" Technical Report Microsoft Research MSR TR, No. MSR-TR-2004-47, Jun. 2, 2004, pp. 1-9 XP002297048.

European Supplemental Search Report cited dated Mar. 31, 2008 cited in European Application No. 04795870.7-1238 PCT/US2004034767, pp. 1-4.

Mexican Office Action mailed May 20, 2010 cited in Mexican Application No. Mx/a/2008/004759, pp. 1-8.

Chinese Office Action mailed Jul. 14, 2010 cited in Chinese Application No. 200680040115.7, pp. 1-12.

Japanese Notice of Rejection mailed Jun. 15, 2012 in Application No. 2008-537721, 13 pages.

P. Hoffman, "SMTP Service Extension for Secure SMTP over Transport Layer Security," Network Working Group Request for Comments: 3207, [online], Feb. 2002, Obsoletes; 2487 [retrieved on Jun. 4, 2012], Retrieved from the Internet, URL, <http://www.ietf.org/rfc/rfc3207.txt>, 10 pages.

Will Price, Michael Elkins, "Extensions to TLS for OpenPGP keys," TLS Workding Group Internet-Draft, [online], Feb. 18, 2002, <draft-ietf-tis-openpgp-02.txt>, [retrieved on Jun. 4, 2012]. Retrieved from the Internet, URL, <http://www7b.biglobe.ne.jp/~k-west/SSLandTLS/draft-ietf-tis-openpgp-02.txt>, 4 pages.

A. Medvinsky, M. Hur, "Addition of Kerberos Cipher Suites to Transport Layer Security (TLS)," Network Working Group Request for Comments; 2712, [online], Oct. 1999, Category: Standards rack, [retrieved on Jun. 5, 2012]. Retrieved from the Internet, URL, <http://www.ietf.org/rfc/rfc2712.txt>, 8 pages.

"Re: SMTP and Exchange Server 2003," [online] May 4, 2005, [retrieved on Jun. 4, 2012]. Retrieved from the Internet, URL, <http://technet.microsoft.com/ja-jp/library/aa996068%28v=exchg.65%29.aspx>, 6 pages.

Nobuhiro Kobayashi, Tetsuo Nakakawaji, "Information exchange infrastructure about authentication and authorization," IPSJ SIG Technical Report, vol. 2003, No. 45, pp. 29 to 34, Information Processing Society of Japan, Japan, May 16, 2003.

Paul Robichaux, "Windows Server: System Manager's View, Exchange makes the use of SSL Certificates easy," IT pro, [online], Oct. 23, 2006, [retrieved on May 10, 2012], Retrieved from the Internet, URL, <http://itpro.nikkeibp.co.jp/article/COLUMN/20061020/251415/>, 9 pages.

N. Zhang, Q. Shi, M. Merabti, "An efficient protocol for anonymous and fair document exchange," Computer Networks, vol. 41, Issue 1, pp. 19 to 28, Jan. 15, 2003.

Ibrahim Haijeh, Ahmed Serhrouchni, Frederique Tastet, "ISAKMP Handshake for SSL/TLS," IEEE Global Telecommunications Conference 2003 (GLOBECOM 2003) [online], vol. 3, pp. 1481-1485, Dec. 2003, [retrieved on May 10, 2012]. Retrieved from the Internet, URL, <http://ieeexplore.ieee.org/stamp/stamp.jsp?arnumber=01258484>.

Joseph Hui, "TLS Pathsec Protocol," TLS Working Group Internet-Draft, [online], Dec. 2001,<draft-ietf-tls-pathsec-00.txt>, [retrieved on May 11, 2012], Retreived from the Internet, URL, <http://www7b.biglobe.ne.jp/~k-west/SSLandTLS/draft-ietf-tis-pathsec-00.txt>, 44 pages.

International Search Report dated Feb. 21, 2007 for International Application No. PCT/US2006/038240.

* cited by examiner

TOTAL EXCHANGE SESSION SECURITY

CROSS-REFERENCE TO RELATED APPLICATIONS

This application claims the benefit of U.S. Provisional Patent application Ser. No. 60/731,798 entitled "TOTAL EXCHANGE SESSION SECURITY" and filed Oct. 31, 2005. The entirety of the above-noted application is incorporated by reference herein.

BACKGROUND

Securing the traffic between two mail servers is critical to maintaining privacy of electronic data and communications. For example, securing communications between two Exchange-brand servers can be particularly useful for individuals and organizations that routinely send and receive confidential information via electronic mail. Using a traditional SSL/TLS approach requires deploying a certificate based public key infrastructure (PKI) which is very complicated. This has proven to be a very large impediment for using SSL/TLS to secure SMTP (simple mail transfer protocol) traffic for many users of mail server, for example, Exchange-brand server.

Authentication can refer to the process of verifying the identity of a user that is logging onto a computer system or verifying the integrity of a transmitted message. In many cases, an authentication token is employed to facilitate the authentication process. For example, an authentication token can be passed to authorized users and retained in their possession for future access and/or transmission of electronic messages.

One common network authentication is the Kerberos authentication protocol. This particular protocol enables individuals that communicate over an insecure network to prove their identity to each other in a very secure manner. In addition to ensuring integrity of transmitted data, the Kerberos authentication protocol facilitates prevention of eavesdropping and/or replay attacks. Most often, the Kerberos protocol is employed in a client-server model where mutual authentication is provided by requiring both the user and the service to verify their respective identity.

SUMMARY

The following presents a simplified summary of the innovation in order to provide a basic understanding of some aspects of the innovation. This summary is not an extensive overview of the innovation. It is not intended to identify key/critical elements of the innovation or to delineate the scope of the innovation. Its sole purpose is to present some concepts of the innovation in a simplified form as a prelude to the more detailed description that is presented later.

The innovation disclosed and claimed herein, in one aspect thereof, comprises a protocol for total email and collaborative software (e.g., Exchange-brand server) session security. By way of example, securing the traffic between two servers within the same organization or cross organizations is oftentimes very problematic. As such, using the traditional SSL/TLS approach requires deploying a certificate based public key infrastructure (PKI) which is very complicated. This has proven to be a large impediment for using SSL/TLS to secure SMTP (simple mail transfer protocol) traffics for many users of mail servers, such as the Exchange-brand server. As well, security requirements of Exchange-brand servers call for not just mutual "authentication" but mutual "authorization."

As will be understood, between two Exchange-brand servers, there is virtually no difference between a client role and server role—both are equal parties. In other words, just as it is important for the receiving side (server) to authorize the sending side (client) to send the information, the sending side should authorize the receiving side to receive information to prevent information disclosure. This two-way security protocol was not possible in conventional systems.

The novel system and/or protocol disclosed herein, in one aspect thereof, can provide a mutually authenticated, authorized, and encrypted channel between two servers, for example Exchange-brand servers, both within the same forest (e.g., organization) and across disparate forests. In one aspect, the system can be employed "out-of-the-box" without requiring further administrative overhead.

In one aspect, the innovation provides for a cryptographic protocol Transport Layer Security (TLS), a mutual generic security service application program interface (MUTUALGSSAPI) and/or a challenge/response system to facilitate secure communications between multiple mail servers (e.g., within and/or between Exchange organizations). One aspect is directed to employing all three of the aforementioned protocols to facilitate secure transmissions. Yet another aspect is directed to the MUTUALGSSAPI which enables mutual authorization.

Securing SMTP traffic between servers is a vital part of overall mail server security. The novel aspects disclosed and claimed herein provide for mutual authentication and authorization of two server endpoints while encrypting the channel of communication. Out-of-the-box, the subject innovation enables true peer to peer security that can ensure authenticity, privacy and integrity of SMTP traffic.

In a nutshell, three sub-protocols can achieve the desired results. First, in accordance with an aspect, TLS with self-signed certificate can be employed to encrypt the communication channel. It will be appreciated that this use of TLS does not require deploying PKI (public key infrastructure) which, as previously stated, adds significant administrative overhead. Although PKI can lead to an increase in administrative overhead, it is to be understood that this, and other known, certificate(s) can be employed in connection with the novelty of the innovation described herein. Next, a mutual authentication (e.g., Kerberos authentication) can be employed which can also enable mutual authorization. Finally, a challenge/response protocol can be employed to ensure the two endpoints that are secured through TLS are exactly the same endpoints that negotiated mutual authentication (e.g., Kerberos). It will be understood that this challenge/response protocol can be particularly useful in preventing a Man-In-The-Middle (MITM) attack.

In yet another aspect thereof, an artificial intelligence component is provided that employs a probabilistic and/or statistical-based analysis to prognose or infer an action that a user desires to be automatically performed.

To the accomplishment of the foregoing and related ends, certain illustrative aspects of the innovation are described herein in connection with the following description and the annexed drawings. These aspects are indicative, however, of but a few of the various ways in which the principles of the innovation can be employed and the subject innovation is intended to include all such aspects and their equivalents. Other advantages and novel features of the innovation will become apparent from the following detailed description of the innovation when considered in conjunction with the drawings.

DETAILED DESCRIPTION

Figure 1:
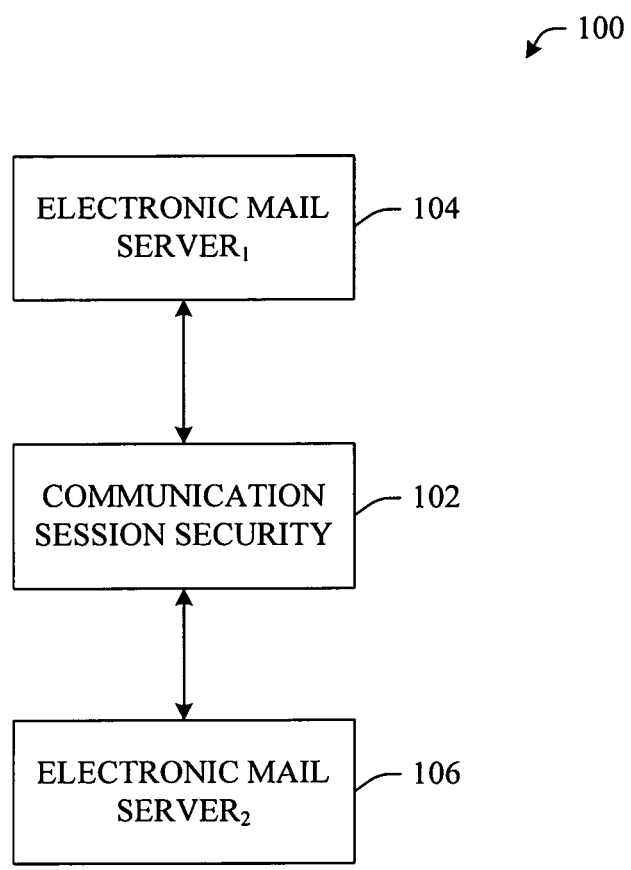
FIG. 1 illustrates a system that facilitates total exchange session security in accordance with an aspect of the novel innovation.

The innovation is now described with reference to the drawings, wherein like reference numerals are used to refer to like elements throughout. In the following description, for purposes of explanation, numerous specific details are set forth in order to provide a thorough understanding of the subject innovation. It may be evident, however, that the innovation can be practiced without these specific details. In other instances, well-known structures and devices are shown in block diagram form in order to facilitate describing the innovation.

As used in this application, the terms "component" and "system" are intended to refer to a computer-related entity, either hardware, a combination of hardware and software, software, or software in execution. For example, a component can be, but is not limited to being, a process running on a processor, a processor, an object, an executable, a thread of execution, a program, and/or a computer. By way of illustration, both an application running on a server and the server can be a component. One or more components can reside within a process and/or thread of execution, and a component can be localized on one computer and/or distributed between two or more computers.

As used herein, the term to "infer" or "inference" refer generally to the process of reasoning about or inferring states of the system, environment, and/or user from a set of observations as captured via events and/or data. Inference can be employed to identify a specific context or action, or can generate a probability distribution over states, for example. The inference can be probabilistic-that is, the computation of a probability distribution over states of interest based on a consideration of data and events. Inference can also refer to techniques employed for composing higher-level events from a set of events and/or data. Such inference results in the construction of new events or actions from a set of observed events and/or stored event data, whether or not the events are correlated in close temporal proximity, and whether the events and data come from one or several event and data sources.

Referring initially to the drawings, FIG. 1 illustrates a system 100 that facilitates total session security between multiple electronic mail servers. Generally, system 100 can include a communication session security component 102 that facilitates secure communications between two disparate electronic mail servers (104, 106). Although the system 100 illustrated in FIG. 1 depicts two electronic mail components, it is to be understood and appreciated that the novel concepts and mechanisms described herein can be employed in accordance with networks configured with any number of servers. As well, although "electronic mail" servers are illustrated, it is to be understood that the novel security concepts and/or mechanisms can be applied to any form of data communication without departing from the spirit and scope of the innovation and claims appended hereto.

The innovation disclosed and claimed herein, in one aspect thereof, comprises a protocol that enables total email and collaborative software (e.g., Exchange-brand server) session security. By way of example and as illustrated in FIG. 1, the novel system can secure traffic between two servers (104, 106) within the same organization or cross organizations which is oftentimes very problematic.

As will be understood, using the traditional SSL/TLS approach would require deploying a certificate based public key infrastructure (PKI) which is very complicated. This conventional approach has proven to be a large impediment for using SSL/TLS to secure SMTP (simple mail transfer protocol) traffic for many users of mail servers, such as the Exchange-brand server. As well, security requirements of Exchange-brand servers call for not just mutual "authentication" but mutual "authorization."

Although the aspects described herein are directed to Exchange-brand servers, it is to be understood that the novel aspects and functionality described herein can be employed with any communication and/or data traffic server without departing from the spirit and scope of this disclosure and claims appended hereto. With continued reference to FIG. 1, as will be understood, between two Exchange-brand servers (e.g., 104, 106), there is virtually no difference between a client role and server role—both are equal parties. In other words, just as it is important for the receiving side (server) to authorize the sending side (client) to send the information, the sending side should authorize the receiving side to receive information to prevent information disclosure. Those skilled in the art will appreciate that this two-way security protocol was not possible in conventional systems.

The novel system 100 and/or protocol disclosed herein can provide a mutually authenticated, authorized, and encrypted channel (via communication session security component 102) between two servers (e.g., 104, 106), for example Exchange-brand servers, both within the same forest (e.g., organization) and across forest. In one aspect, the system can be employed "out-of-the-box" without requiring further administrative overhead.

Figure 2:
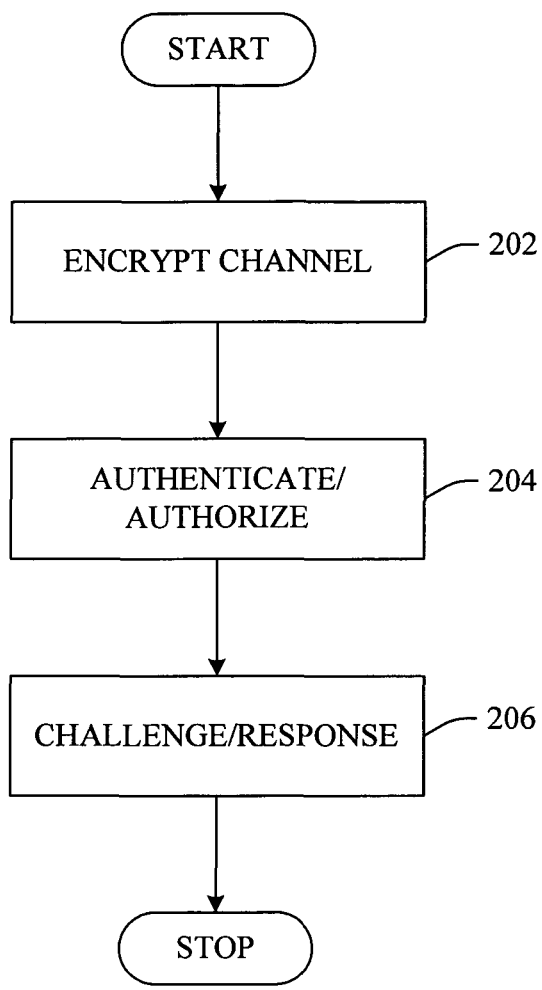
FIG. 2 illustrates an exemplary flow chart of procedures that facilitate transmission security in accordance with an aspect of the innovation.

FIG. 2 illustrates a methodology of facilitating secure communications in accordance with an aspect of the innovation. While, for purposes of simplicity of explanation, the one or more methodologies shown herein, e.g., in the form of a flow chart, are shown and described as a series of acts, it is to be understood and appreciated that the subject innovation is not limited by the order of acts, as some acts may, in accordance with the innovation, occur in a different order and/or concurrently with other acts from that shown and described herein. For example, those skilled in the art will understand and appreciate that a methodology could alternatively be represented as a series of interrelated states or events, such as in a state diagram. Moreover, not all illustrated acts may be required to implement a methodology in accordance with the innovation.

At 202, the transmission channel is encrypted. As was described above and will be described in greater detail infra, a transport layer security (TLS) or equivalent cryptographic technique can be employed to encrypt the communication channel. At 204, authentication of the sender and authorization of the receiver is accomplished. In one aspect, a novel MUTUALGSSAPI protocol can be employed to facilitate authentication and/or authorization of the sender and receiver.

Once the communication channel is encrypted and the sender and receiver are authenticated and authorized to communicate, the session security can be further secured. At 206, a challenge/response mechanism can be employed to further secure communication and/or transmission of data between the entities. These novel process steps, individually as well as combined, will be described in greater detail with reference to the figures that follow.

Figure 3:
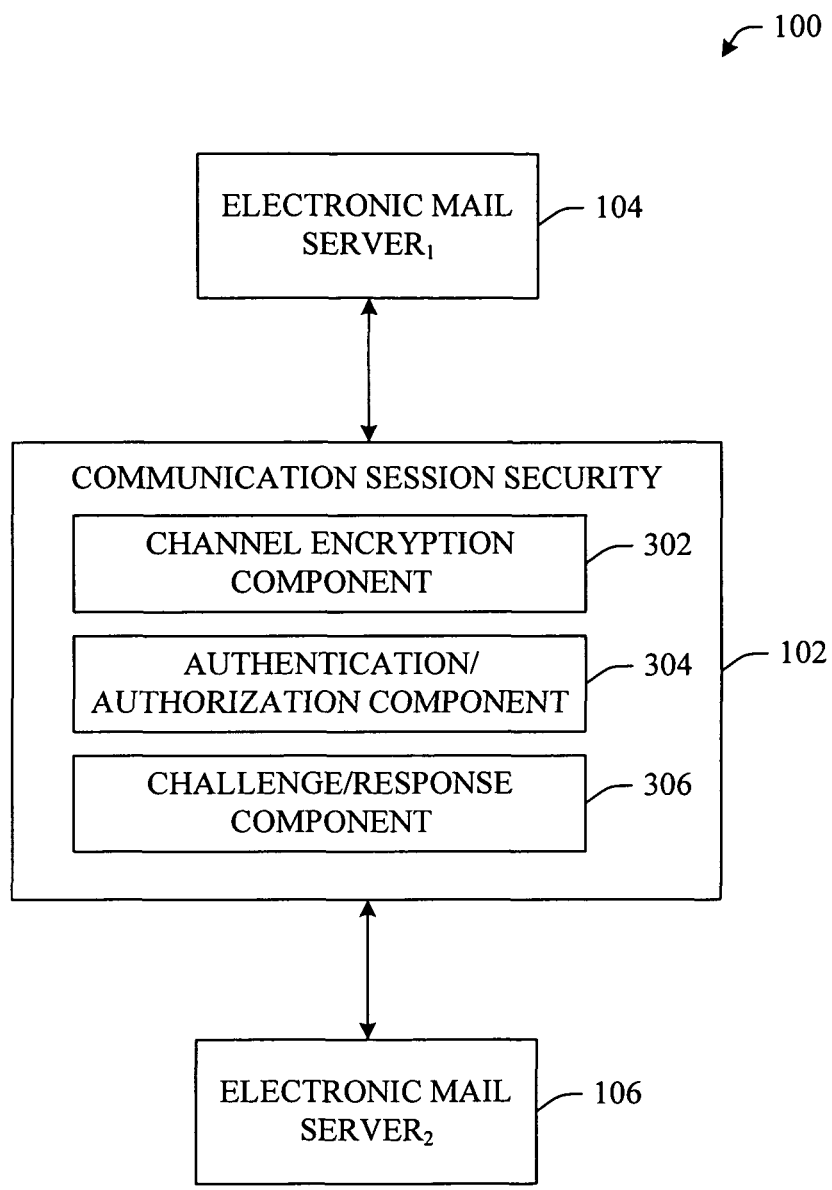
FIG. 3 illustrates a block diagram of a general system that employs a channel encryption component, an authentication/authorization component and a challenge/response component in accordance with an aspect of the innovation.

FIG. 3 illustrates an alternative block diagram of system 100 in accordance with the novel functionality of the innovation described and claimed herein. In particular, communication session security component 102 can include a channel encryption component 302, an authentication/authorization component 304 and a challenge/response component 306. It will be understood and appreciated that these three components 302, 304, 306 can facilitate securing data traffic between two disparate mail servers 104, 106.

Each of these sub-components will be described in greater detail with respect to a more specific example with reference to FIG. 4 that follows. It is to be understood that although specific protocols are employed in accordance with the aspect described in FIG. 4, alternative aspects can exist that employ other encryption, authentication/authorization and challenge/response mechanisms without departing from the spirit and scope of the innovation described herein. As such, these alternative aspects are to be included within the scope of this disclosure and claims appended hereto.

Figure 4:
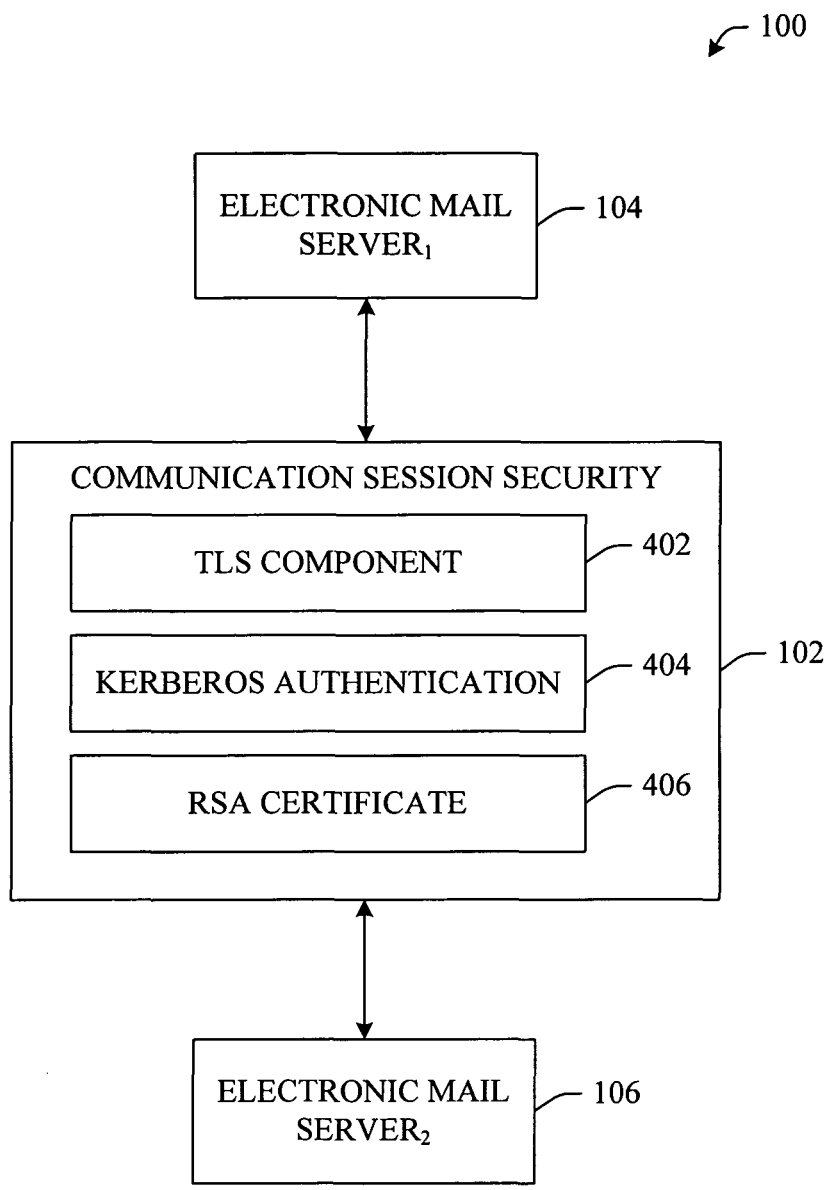
FIG. 4 illustrates a block diagram of a specific system that employs a TLS component, a Kerberos authentication component and an RSA certificate component to facilitate secure communication in accordance with an aspect of the innovation.

FIG. 4 illustrates a more specific example of system 100 in accordance with an aspect of the innovation. In this aspect, the innovation provides for a cryptographic protocol Transport Layer Security (TLS) 402, a mutual generic security service application program interface (MUTUALGSSAPI) 404 and a challenge/response system 406 to facilitate secure communications between multiple mail servers 104, 106 (e.g., via the Internet). More particularly, one aspect is directed to employing all three of the aforementioned protocols 402, 404, 406 to facilitate secure transmissions. Yet another aspect is directed to a novel MUTUALGSSAPI 102 which enables a novel mutual authentication and/or authorization between two electronic mail servers.

Securing SMTP traffic between servers (e.g., 104, 106) is a vital part of overall mail server security. The novel aspects disclosed and claimed herein provide for mutual authentication and authorization of two server endpoints while encrypting the channel of communication. Out-of-the-box, the subject innovation can enable true peer to peer security that can ensure authenticity, privacy and integrity of SMTP traffic.

In a nutshell, three sub-protocols 402, 404, 406 can achieve the desired results. First TLS component 402 with self-signed certificate can be employed to encrypt the communication channel. It will be appreciated that this use of TLS component 402 does not require deploying PKI (public key infrastructure) which, as previously stated, adds significant administrative overhead. Next, a mutual authentication (e.g., Kerberos authentication 404) can be employed which can also enable mutual authorization. Finally, a challenge/response protocol 406 can be employed to ensure the two endpoints that are secured through TLS are exactly the same endpoints that negotiated mutual authentication (e.g., Kerberos). It will be understood that this challenge/response protocol 404 can be particularly useful in preventing a Man-In-The-Middle (MITM) attack.

As stated above, although the following aspects are directed to employing the novelty of the subject innovation in an Exchange-brand server scenario, it is to be understood that the novel aspects can be employed in connection with any electronic mail and/or data traffic server known in the art. As was described above with reference to the communication session security component 102 of FIG. 4, transport authentication and authorization component is a vital part of overall Exchange-brand security. In particular, this component, e.g., communication session security component 102, can mutually authenticate and authorize two Exchange-brand server endpoints, and encrypt the channel. By default, the system can provide a true peer to peer security that can ensure authenticity, privacy and integrity of SMTP traffic.

With reference to the X-EXPS MUTUALGSSAPI component 102, X-EXPS is an Exchange-brand specific authentication extension that can carry various security package tokens. It will be appreciated that, prior to Exchange-brand 12, GAS SPI (SpNego package) was the default package used to authenticate between two servers (e.g., 104, 106). Aside from not being able to encrypt the SMTP traffic, GSSAPI follows the traditional windows dumb client model. This means that, after the negotiation, the client does not possess the server token.

Without the server token, the client could not authorize the proper interaction it is allowed with the server the same way the server authorizes the client. As was stated above, in Exchange-brand scenarios, there is little difference between two Exchange-brand servers in terms of client and server role. Both are frequently equal parties, and the only difference is that client is always the initiating party of the conversation. Therefore, the novel mutual authorization as disclosed and claimed herein is critical in preventing information disclosure.

In accordance with the innovation (as described in the Exchange-brand scenario), MUTUALGSSAPI is introduced which can employ a Kerberos SSPI. One reason for replacing the conventional SpNego with Kerberos (which can negotiate between Kerberos and NTLM) is to prevent exploit through a down-grade attack. MUTUALGSSAPI can allow both ends (e.g., Server$_1$ 104, Server$_2$ 106) to initiate Kerberos conversation so both can obtain the access token of the other side.

Figure 5:
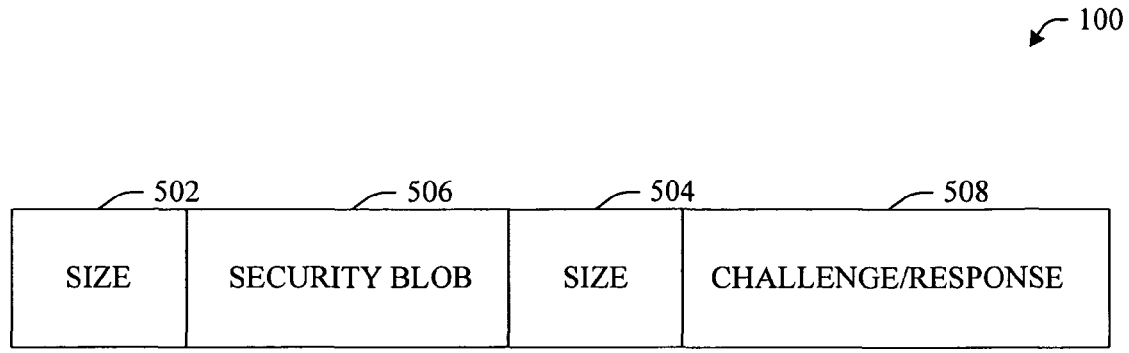
FIG. 5 illustrates an exemplary structure of a complete MUTUALGSSAPI buffer in accordance with an aspect of the novel innovation.

Referring now to FIG. 5, in one aspect, a complete MUTUALGSSAPI buffer can have the structure shown. More particularly, Size Headers 502, 504 can indicate a size (e.g., in hex value with fixed length of 4 bytes) of the each payload section in bytes. As illustrated, a Security Blob Payload 506 can carry two-way authentication blobs. Similarly, a Challenge/Response Payload 508 can carry challenge/response data that can enable tying Kerberos (client->server) session key, TLS session key and self-signed RSA certificate public key to prevent MITM.

Turning now to a discussion of X-EXPS MUTUALGSSAPI+X-AnonymousTLS, since the token generated by Kerberos can be vulnerable to MITM attack, the subject innovation employs the session key derived from the negotiation to encrypt the channel. More particularly, instead of using the Kerberos session key for encryption, one aspect of the innovation employs a combination of Kerberos and TLS to achieve the same goal. In essence, Kerberos can facilitate the authentication, TLS can facilitate the encryption, and a challenge/response sub-protocol can fend off MITM exploit. This aspect will be described in greater detail infra.

In operation, one effect of MUTUALGSSAPI negotiation is that both endpoints (e.g., server 104, 106) have a shared secret (e.g., a Kerberos session key). In fact, both sides will have two session keys from two-way communications. The subject innovation uses client->server one for challenge response purpose. Additionally, both sides possess access to the token of the remote side.

To prevent MITM, two tasks will be accomplished. First, the integrity and privacy of the token buffer has to be protected under TLS. Second, the challenge/response protocol must prove that the both endpoints who negotiated MUTUALGSSAPI are also the same parties who negotiated TLS. The public key of the self-signed RSA certificate is included in the hash of challenge response protocol so that MITM cannot coerce both client and server to negotiate the same TLS session key with the attacker. Man-In-The-Middle is ruled out because the attacker does not possess all 3 keys (TLS session key, Kerberos session key and RSA certificate public key) at the same time.

A novel feature of the subject innovation is the introduction of a new extension called X-AnonymousTLS. In operation, it behaves like STARTTLS except that there is no certificate verification. As such, it is to be understood that TLS is employed in connection with this innovation to provide integrity and privacy protection and not necessarily to provide authentication. The certificate used by X-AnonymousTLS is a self-signed RSA certificate generated in memory store. X-AnonymousTLS works in conjunction with X-EXPS MUTUALGSSAPI. As well, the innovation enforces this protocol sequence. In addition, the server can advertise the hash algorithm used in a challenge-response sub-protocol that it deems acceptable under a new extension called "MUTUALGSSAPIHASH." The client can select the one it deems appropriate, and indicates its choice in the first blob (e.g., 506 of FIG. 5) sent to the server.

Figure 6:
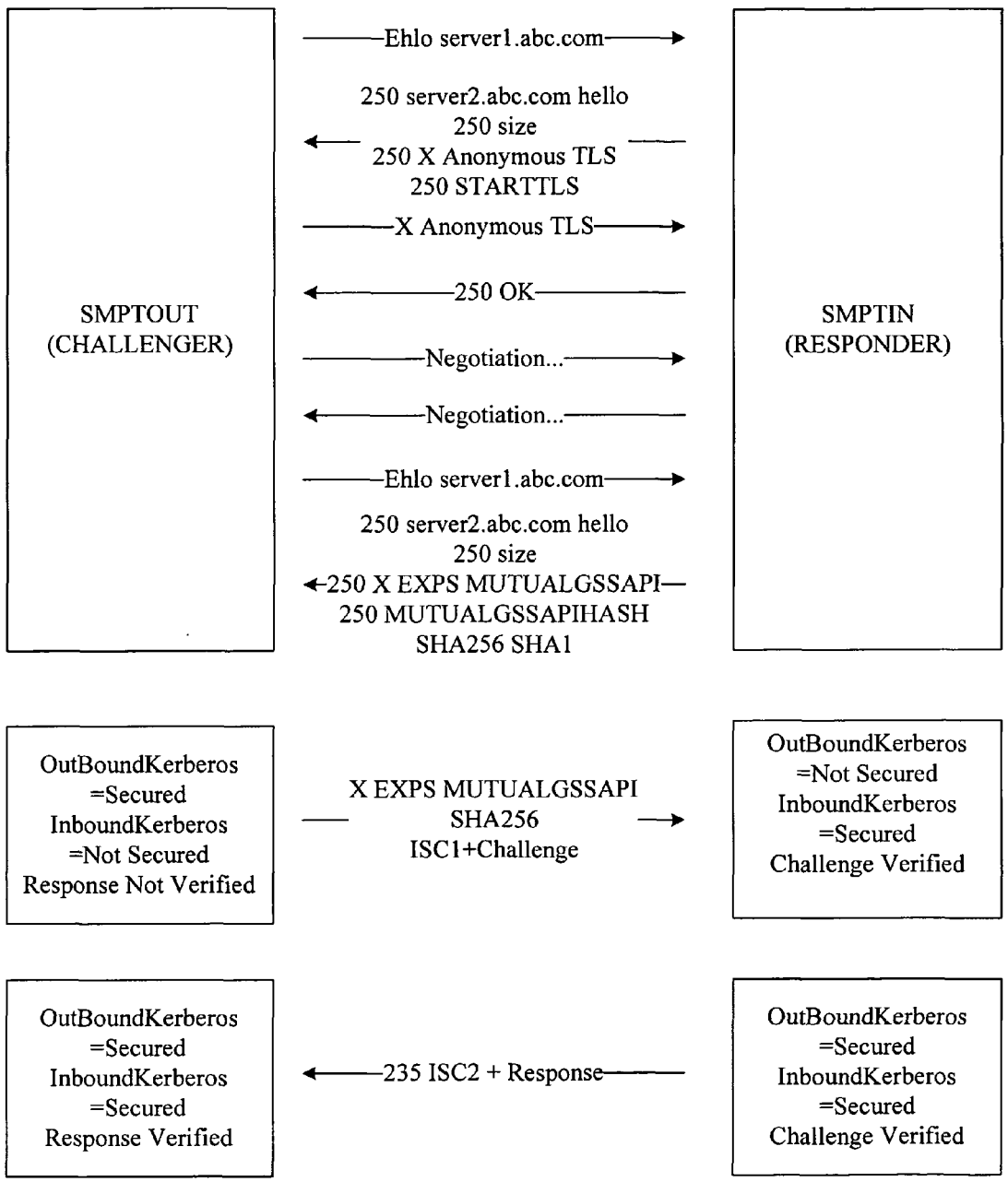
FIG. 6 illustrates an exemplary protocol sequence under a normal successful x-anonymoustls+MUTUALGSSAPI session in accordance with an aspect of the innovation.

FIG. 6 illustrates an exemplary protocol sequence under a normal successful X-AnonymousTLS+MUTUALGSSAPI session. Following is an act by act explanation of FIG. 6.

1) SmtpOut sends ehlo along with its own server FQDN (SmtpOutFQDN) to SmtpIn.
2) Per SMTP RFC, SmtpIn responds with banner advertising its own FQDN (SmtpInFQDN) as well as x-anonymoustls. It can also advertise starttls at the same time. MUTUALGSSAPI is not advertised until x-anonymoustls is established.
3) SmtpOut chooses to engage x-anonymoustls negotiation with SmtpIn. As a result, a TLS session is established.
4) Per SMTP RFC, SmtpOut sends another ehlo to SmtpIn.
5) SmtpIn responds with banner now showing the support of X-EXPS MUTUALGSSAPI. At the same time, both starttls and x-anonymoustls are eliminated from the banner as the session is already in TLS. In addition, SmtpIn also advertise that it supports both SHA256 and SHA1 as hashing method used in MUTUALGSSAPI protocol.
6) SmtpOut obtains a Kerberos ticket for SmtpIn using SmtpInFQDN obtained in ehlo response. The ticket is represented as ISC1 in the above diagram. At this point, SmtpOut has obtained the Kerberos session key as well as the TLS shared secret key. Thus, SmtpOut can construct Challenge=SHA256(KerberosKey+TLSKey+CertPubKey). It picks SHA256 because it is more secure. Finally, SmtpOut sends the hashing method it picks, the Kerberos ticket, and the challenge to SmtpIn. At this point, as far as SmtpOut is concerned, the outbound Kerberos authentication has finished, the challenge has been sent but response not verified.
7) SmtpIn parses the payload in step 6. It knows SmtpOut has chosen SHA256 for hash used in the Challenge/Response sub-protocol. SmtpIn validate SmtpOut's Kerberos ticket (ISC1). Under Kerberos, this call should either succeed or fail without generating further ticket token. If the ticket validation succeeds, SmtpIn will validate SmtpOut's challenge and generate the response. If succeeded, SmtpIn has authenticated SmtpOut. Before it tries to obtain a ticket to SmtpOut, SmtpIn will do a complete authorization check against SmtpOut's token. After both authentication and authorization are completed, SmtpIn will try to obtain a Kerberos ticket (ISC2) to access SmtpOut. Finally, SmtpIn will send ISC2 and the response back to SmtpOut. At this point, SmtpIn has fully authenticated and authorized SmtpOut.
8) SmtpOut parses ISC2+response. It will first validate the response. If succeeded, SmtpOut will proceed to validate ISC2 to obtain SmtpIn's token. If this also succeeds, SmtpOut will do the same authorization check in step 7 to authorize SmtpIn. Then SmtpOut has fully authenticated and authorized SmtpIn.
9) Any error in any phrase on SmtpIn side (e.g., fail to obtain or validate the Kerberos ticket or error in validating the challenge) will cause the server side to send 5xx error and disconnect. Like wise, any error in this protocol sequence on SmtpOut side will cause it to cancel and drop the session.

Turning now to a discussion of the challenge/response mechanisms, one purpose of challenge/response is to prove both sides have the same Kerberos and TLS session key and the public key of the self-signed RSA certificate. Based on Kerberos protocol, SmtpOut is always the challenger. It is to be appreciated that any hashing algorithm can be employed with alternative aspects of the innovation. In one aspect:

Challenge=SHA256(KerberosKey+TlsKey+CertPubKey)

Response=SHA256(Challenge+KerberosKey+TlsKey+CertPubKey)

The challenger proves possession of all 3 keys when the server computes the same hash based upon its own data. It will be understood that an attacker could not know all 3 keys. The responder can prove possession of all 3 keys by putting a version of 3 keys and challenge into hash. The other side could verify because it is the only other party who possesses the same information. The attacker (MITM) can not coerce the client and server to engage separate TLS sessions and still generate the same TLS session key because CertPubKey is included in the challenge response. This is essentially equivalent to certificate validation which prevents the classic MITM attack against TLS.

With respect to authentication state machine, each side has the following state variables to keep track of the negotiation state.

None
InboundSecured
OutboundSecured
Success—Both inbound and outbound are secured and challenge/response verified.

A secure channel can be established when both direction of authentication has been successful. As well, a challenge/response status can be verified. In addition, each side is in possession of the access token of the remote for authorization check.

The subject innovation discloses a security analysis of TLS+MUTUALGSSAPI. TLS+MUTUALGSSAPI can prevent MITM attack because a hacker could not possibly know all 3 keys (e.g., Kerberos, TLS session key and CertPubKey). If a hacker inserts in the middle and engages a separate TLS conversation with server A and B, the attacker will be detected by challenge response without Kerberos session key. The hacker could not tap the direct TLS conversation between A and B because the attacker could not decrypt or alter the channel undetected.

As mentioned in supra, in order to prevent MITM, CertPubKey (or equivalent) must be included in the challenge response protocol. To enforce this, the x-anonymoustls will generate the self-signed RSA certificate (or equivalent) on the fly and store it in in-memory store. Under RSA key exchange, if the client does not validate the server's certificate, it is possible for MITM to coerce both client and server to generate the same TLS session key with the attacker. If MITM can do that, it will defeat the purpose of challenge/response protocol. Therefore, the subject innovation includes RSA certificate's public key in the challenge response to defeat this attack.

Still, the possible attack can exploit protocol implementation error to uncouple TLS and MUTUALGSSAPI. Therefore, the novel design of the subject innovation enforces that X-AnonymousTLS and EXPS MUTUALGSSAPI are in closely coupled sequence. Finally, as with any other security assumption, the complete compromise of either side the server totally defeats TLS+MUTUALGSSAPI mechanism.

Figure 7:
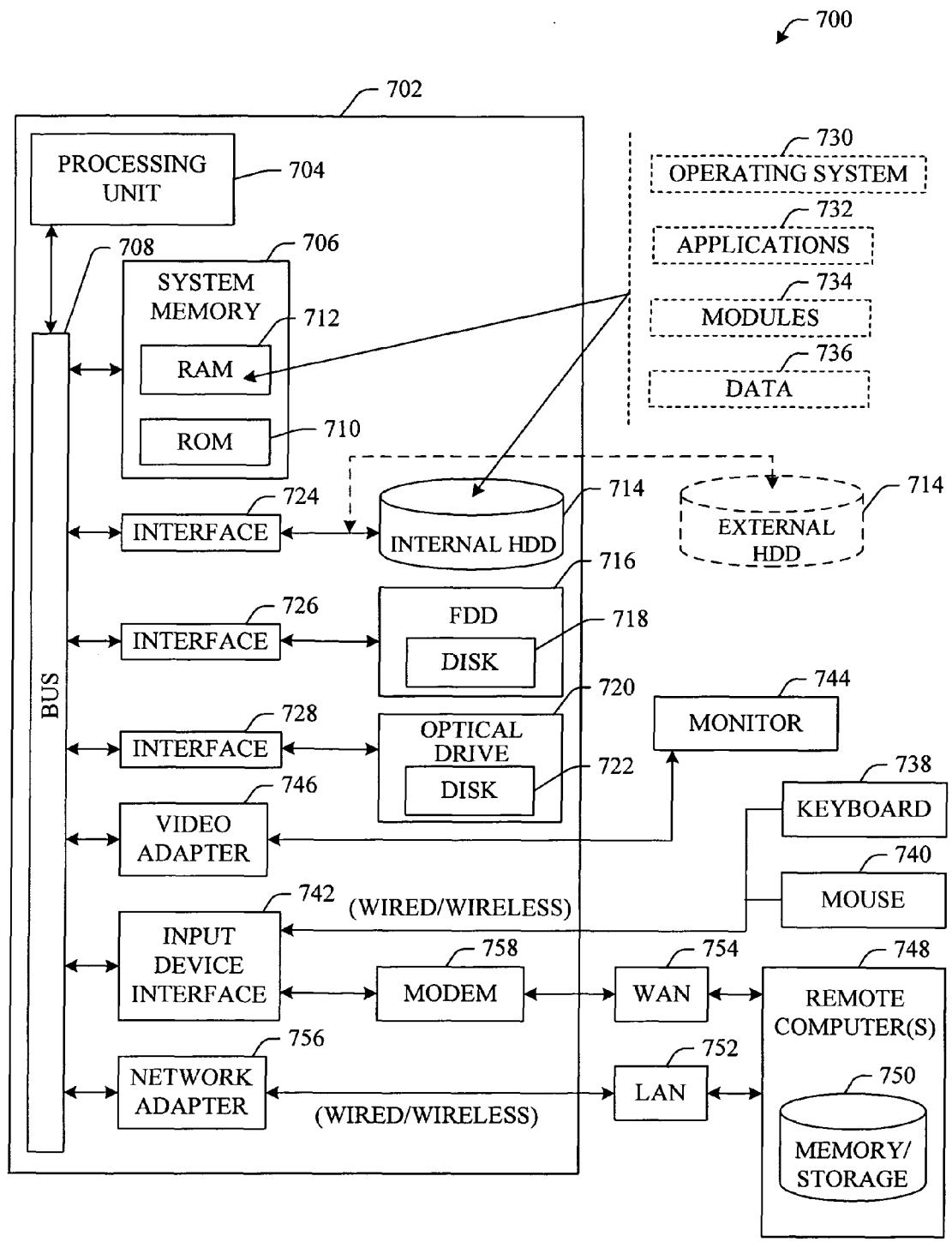
FIG. 7 illustrates a block diagram of a computer operable to execute the disclosed architecture.

Referring now to FIG. 7, there is illustrated a block diagram of a computer operable to execute the disclosed architecture with respect to session security. In order to provide additional context for various aspects of the subject innovation, FIG. 7 and the following discussion are intended to provide a brief, general description of a suitable computing environment 700 in which the various aspects of the innovation can be implemented. While the innovation has been described above in the general context of computer-executable instructions that may run on one or more computers, those skilled in the art will recognize that the innovation also can be implemented in combination with other program modules and/or as a combination of hardware and software.

Generally, program modules include routines, programs, components, data structures, etc., that perform particular tasks or implement particular abstract data types. Moreover, those skilled in the art will appreciate that the inventive methods can be practiced with other computer system configurations, including single-processor or multiprocessor computer systems, minicomputers, mainframe computers, as well as personal computers, hand-held computing devices, microprocessor-based or programmable consumer electronics, and the like, each of which can be operatively coupled to one or more associated devices.

The illustrated aspects of the innovation may also be practiced in distributed computing environments where certain tasks are performed by remote processing devices that are linked through a communications network. In a distributed computing environment, program modules can be located in both local and remote memory storage devices.

A computer typically includes a variety of computer-readable media. Computer-readable media can be any available media that can be accessed by the computer and includes both volatile and nonvolatile media, removable and non-removable media. By way of example, and not limitation, computer-readable media can comprise computer storage media and communication media. Computer storage media includes both volatile and nonvolatile, removable and non-removable media implemented in any method or technology for storage of information such as computer-readable instructions, data structures, program modules or other data. Computer storage media includes, but is not limited to, RAM, ROM, EEPROM, flash memory or other memory technology, CD-ROM, digital versatile disk (DVD) or other optical disk storage, magnetic cassettes, magnetic tape, magnetic disk storage or other magnetic storage devices, or any other medium which can be used to store the desired information and which can be accessed by the computer.

Communication media typically embodies computer-readable instructions, data structures, program modules or other data in a modulated data signal such as a carrier wave or other transport mechanism, and includes any information delivery media. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, RF, infrared and other wireless media. Combinations of the any of the above should also be included within the scope of computer-readable media.

With reference again to FIG. 7, the exemplary environment 700 for implementing various aspects of the innovation includes a computer 702, the computer 702 including a processing unit 704, a system memory 706 and a system bus 708. The system bus 708 couples system components including, but not limited to, the system memory 706 to the processing unit 704. The processing unit 704 can be any of various commercially available processors. Dual microprocessors and other multi-processor architectures may also be employed as the processing unit 704.

The system bus 708 can be any of several types of bus structure that may further interconnect to a memory bus (with or without a memory controller), a peripheral bus, and a local bus using any of a variety of commercially available bus architectures. The system memory 706 includes read-only memory (ROM) 710 and random access memory (RAM) 712. A basic input/output system (BIOS) is stored in a non-volatile memory 710 such as ROM, EPROM, EEPROM, which BIOS contains the basic routines that help to transfer information between elements within the computer 702, such as during start-up. The RAM 712 can also include a high-speed RAM such as static RAM for caching data.

The computer 702 further includes an internal hard disk drive (HDD) 714 (e.g., EIDE, SATA), which internal hard disk drive 714 may also be configured for external use in a suitable chassis (not shown), a magnetic floppy disk drive (FDD) 716, (e.g., to read from or write to a removable diskette 718) and an optical disk drive 720, (e.g., reading a CD-ROM disk 722 or, to read from or write to other high capacity optical media such as the DVD). The hard disk drive 714, magnetic disk drive 716 and optical disk drive 720 can be connected to the system bus 708 by a hard disk drive interface 724, a magnetic disk drive interface 726 and an optical drive interface 728, respectively. The interface 724 for external drive implementations includes at least one or both of Universal Serial Bus (USB) and IEEE 1394 interface technologies. Other external drive connection technologies are within contemplation of the subject innovation.

The drives and their associated computer-readable media provide nonvolatile storage of data, data structures, computer-executable instructions, and so forth. For the computer 702, the drives and media accommodate the storage of any data in a suitable digital format. Although the description of computer-readable media above refers to a HDD, a removable magnetic diskette, and a removable optical media such as a CD or DVD, it should be appreciated by those skilled in the art that other types of media which are readable by a computer, such as zip drives, magnetic cassettes, flash memory cards, cartridges, and the like, may also be used in the exemplary operating environment, and further, that any such media may contain computer-executable instructions for performing the methods of the innovation.

A number of program modules can be stored in the drives and RAM 712, including an operating system 730, one or more application programs 732, other program modules 734 and program data 736. All or portions of the operating system, applications, modules, and/or data can also be cached in the RAM 712. It is appreciated that the innovation can be implemented with various commercially available operating systems or combinations of operating systems.

A user can enter commands and information into the computer 702 through one or more wired/wireless input devices, e.g., a keyboard 738 and a pointing device, such as a mouse 740. Other input devices (not shown) may include a microphone, an IR remote control, a joystick, a game pad, a stylus pen, touch screen, or the like. These and other input devices are often connected to the processing unit 704 through an input device interface 742 that is coupled to the system bus 708, but can be connected by other interfaces, such as a parallel port, an IEEE 1394 serial port, a game port, a USB port, an IR interface, etc.

A monitor 744 or other type of display device is also connected to the system bus 708 via an interface, such as a video adapter 746. In addition to the monitor 744, a computer typically includes other peripheral output devices (not shown), such as speakers, printers, etc.

The computer 702 may operate in a networked environment using logical connections via wired and/or wireless communications to one or more remote computers, such as a remote computer(s) 748. The remote computer(s) 748 can be a workstation, a server computer, a router, a personal computer, portable computer, microprocessor-based entertainment appliance, a peer device or other common network node, and typically includes many or all of the elements described relative to the computer 702, although, for purposes of brevity, only a memory/storage device 750 is illustrated. The logical connections depicted include wired/wireless connectivity to a local area network (LAN) 752 and/or larger networks, e.g., a wide area network (WAN) 754. Such LAN and WAN networking environments are commonplace in offices and companies, and facilitate enterprise-wide computer networks, such as intranets, all of which may connect to a global communications network, e.g., the Internet.

When used in a LAN networking environment, the computer 702 is connected to the local network 752 through a wired and/or wireless communication network interface or adapter 756. The adapter 756 may facilitate wired or wireless communication to the LAN 752, which may also include a wireless access point disposed thereon for communicating with the wireless adapter 756.

When used in a WAN networking environment, the computer 702 can include a modem 758, or is connected to a communications server on the WAN 754, or has other means for establishing communications over the WAN 754, such as by way of the Internet. The modem 758, which can be internal or external and a wired or wireless device, is connected to the system bus 708 via the serial port interface 742. In a networked environment, program modules depicted relative to the computer 702, or portions thereof, can be stored in the remote memory/storage device 750. It will be appreciated that the network connections shown are exemplary and other means of establishing a communications link between the computers can be used.

The computer 702 is operable to communicate with any wireless devices or entities operatively disposed in wireless communication, e.g., a printer, scanner, desktop and/or portable computer, portable data assistant, communications satellite, any piece of equipment or location associated with a wirelessly detectable tag (e.g., a kiosk, news stand, restroom), and telephone. This includes at least Wi-Fi and Bluetooth™ wireless technologies. Thus, the communication can be a predefined structure as with a conventional network or simply an ad hoc communication between at least two devices.

Wi-Fi, or Wireless Fidelity, allows connection to the Internet from a couch at home, a bed in a hotel room, or a conference room at work, without wires. Wi-Fi is a wireless technology similar to that used in a cell phone that enables such devices, e.g., computers, to send and receive data indoors and out; anywhere within the range of a base station. Wi-Fi networks use radio technologies called IEEE 802.11 (a, b, g, etc.) to provide secure, reliable, fast wireless connectivity. A Wi-Fi network can be used to connect computers to each other, to the Internet, and to wired networks (which use IEEE 802.3 or Ethernet). Wi-Fi networks operate in the unlicensed 2.4 and 5 GHz radio bands, at an 11 Mbps (802.11 a) or 54 Mbps (802.11 b) data rate, for example, or with products that contain both bands (dual band), so the networks can provide real-world performance similar to the basic 10 BaseT wired Ethernet networks used in many offices.

Figure 8:
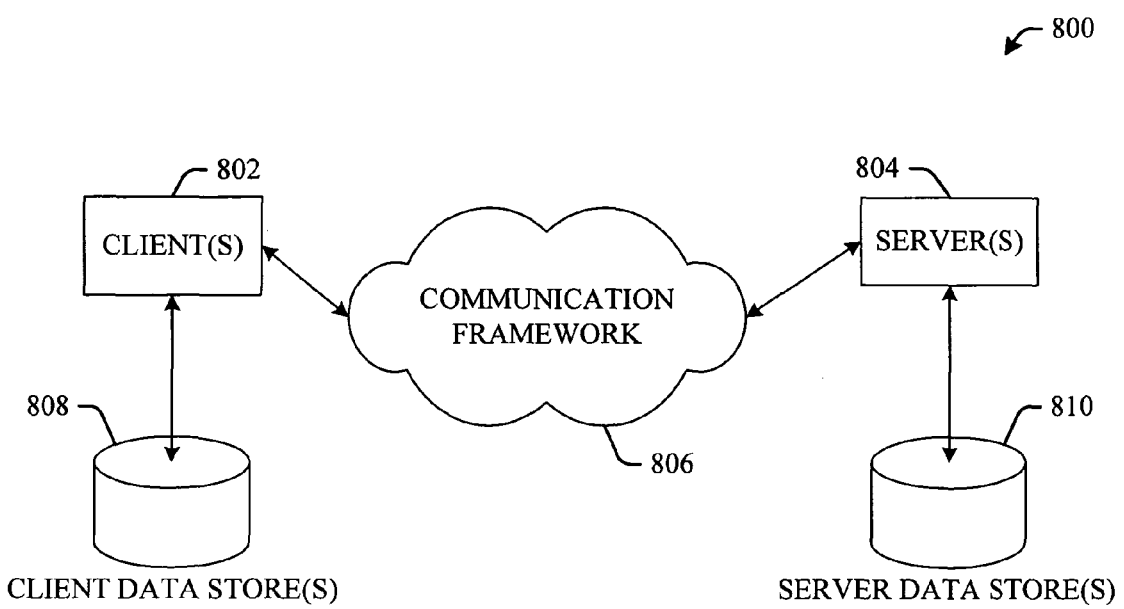
FIG. 8 illustrates a schematic block diagram of an exemplary computing environment in accordance with the subject innovation.

Referring now to FIG. 8, there is illustrated a schematic block diagram of an exemplary computing environment 800 in accordance with the subject innovation. The system 800 includes one or more client(s) 802. The client(s) 802 can be hardware and/or software (e.g., threads, processes, computing devices). The client(s) 802 can house cookie(s) and/or associated contextual information by employing the innovation, for example.

The system 800 also includes one or more server(s) 804. The server(s) 804 can also be hardware and/or software (e.g., threads, processes, computing devices). The servers 804 can house threads to perform transformations by employing the innovation, for example. One possible communication between a client 802 and a server 804 can be in the form of a data packet adapted to be transmitted between two or more computer processes. The data packet may include a cookie and/or associated contextual information, for example. The system 800 includes a communication framework 806 (e.g., a global communication network such as the Internet) that can be employed to facilitate communications between the client(s) 802 and the server(s) 804.

Communications can be facilitated via a wired (including optical fiber) and/or wireless technology. The client(s) 802 are operatively connected to one or more client data store(s) 808 that can be employed to store information local to the client(s) 802 (e.g., cookie(s) and/or associated contextual information). Similarly, the server(s) 804 are operatively connected to one or more server data store(s) 810 that can be employed to store information local to the servers 804.

What has been described above includes examples of the innovation. It is, of course, not possible to describe every conceivable combination of components or methodologies for purposes of describing the subject innovation, but one of ordinary skill in the art may recognize that many further combinations and permutations of the innovation are possible. Accordingly, the innovation is intended to embrace all such alterations, modifications and variations that fall within the spirit and scope of the appended claims. Furthermore, to the extent that the term "includes" is used in either the detailed description or the claims, such term is intended to be inclusive in a manner similar to the term "comprising" as "comprising" is interpreted when employed as a transitional word in a claim.

What is claimed is:

1. A system that facilitates securing communications between two servers, comprising:
   a mutual authentication component that authenticates a sender of a message, the sender being any one of the two servers;
   a mutual authorization component that authorizes a receiver of the message, the receiver is the other of the two servers; and
   a channel encryption component that cryptographically secures a communication channel for the message, the channel encryption component employing an anonymous Transport Layer Security (TLS) mechanism including a self-signed certificate, the self-signed certificate being generated on-the-fly by the anonymous TLS mechanism, the anonymous TLS mechanism being in a coupled sequence with the mutual authorization component securing the communication channel against a Man-In-The-Middle (MITM) attack by utilizing a public key of the self-signed certificate in an MITM challenge response, the mutual authorization component comprising an authentication extension carrying various security package tokens, the anonymous TLS mechanism being employed, without certificate verification, providing integrity and privacy protection and not providing authentication.

2. The system of claim 1, further comprising a challenge/response component that verifies an identity of each of the authenticated and authorized servers.

3. The system of claim 1, wherein the mutual authentication component is a Kerberos cryptographic mechanism.

4. The system of claim 3, wherein the mutual authorization component is a Kerberos cryptographic mechanism.

5. The system of claim 1, wherein the message is a SMTP message.

6. The system of claim 1, wherein the encryption component employs the anonymous TLS mechanism to secure the communication channel, the mutual authentication component is a Kerberos cryptographic mechanism and the mutual authorization component is a Kerberos cryptographic mechanism.

7. A computer-implemented method of securing SMTP traffic between two servers, comprising:
   authenticating a sender of the SMTP traffic; authorizing a receiver of the SMTP traffic; and encrypting a communication channel that facilitates transmission of the SMTP traffic, the act of encrypting employing an anonymous Transport Layer Security (TLS) technique including a self-signed certificate, the self-signed certificate being generated on-the-fly by the anonymous TLS mechanism, the anonymous TLS mechanism being in a coupled sequence with a mutual authorization component securing the channel against a Man-In-The-Middle (MITM) attack by utilizing a public key of the self-signed certificate in an MITM challenge response, the mutual authorization component comprising an authentication extension carrying various security package tokens, the anonymous TLS technique being employed, without certificate verification, providing for integrity and privacy protection and not providing authentication.

8. The computer-implemented method of claim 7, wherein the acts of authenticating and authorizing employ a Kerberos cryptographic technique.

9. The computer-implemented method of claim 8, further comprising challenging the receiver to secure communications between the sender and the receiver utilizing a challenge-response protocol.

10. A system that facilitates security of communications between two Exchange servers, comprising:
    means for authenticating a sender of a message from a first Exchange server;
    means for authorizing a receiver of the message at a second Exchange server; and
    means for securing a communication channel for the message, wherein the means for securing the communication channel is an anonymous Transport Layer Security (TLS) mechanism including a self-signed certificate, the self-signed certificate being generated on-the-fly by the anonymous TLS mechanism, the anonymous TLS mechanism being in a coupled sequence with a mutual authorization component securing the communication channel against a Man-In-The-Middle (MITM) attack by utilizing a public key of the self-signed certificate in an MITM challenge response, the mutual authorization component comprising an authentication extension carrying various security package tokens, to secure the communication channel, the anonymous TLS mechanism being employed, without certificate verification, providing integrity and privacy protection and not providing authentication.

11. The system of claim 10, further comprising means for securing a communication channel for the message.

12. The system of claim 11, further comprising means for verifying an identity of the sender and the receiver.

13. The system of claim 12, wherein the means for verifying the identity is a challenge/response mechanism.

14. The system of claim 13, wherein the means for authenticating the sender and the means for authorizing the receiver is a Kerberos cryptographic mechanism.

* * * * *